United States Patent [19]
Dinse

[11] 3,798,410
[45] Mar. 19, 1974

[54] SHIELD-GAS WELDING GUN
[76] Inventor: Wilhelm Dinse, Konigsreihe 12, 2 Hamburg 70, Germany
[22] Filed: Sept. 8, 1972
[21] Appl. No.: 287,590

[30] Foreign Application Priority Data
June 3, 1972 Germany.......................... 2227118

[52] U.S. Cl. ............................................. 219/130
[51] Int. Cl. ............................................... B23k 9/00
[58] Field of Search..................... 219/130, 136, 74

[56] References Cited
UNITED STATES PATENTS
| 3,433,882 | 3/1969 | Henriksen et al. | 219/136 X |
| 3,629,547 | 12/1971 | Kester et al. | 219/130 |
| 2,659,796 | 11/1953 | Anderson | 219/130 |
| 2,817,749 | 12/1957 | Flood et al. | 219/130 |
| 2,960,598 | 11/1960 | Verhaeghe et al. | 219/74 X |
| 3,189,723 | 6/1965 | Adamson | 219/130 |

Primary Examiner—J. V. Truhe
Attorney, Agent, or Firm—H. Dale Palmatier; James R. Haller

[57] ABSTRACT

A shield-gas welding gun having an insulating housing forming a handle enclosing a double walled tubular body through which the welding filler rod is moved toward the contact tip; the double walled tubular body carrying shield-gas between the internal and external walls thereof, the peripheral confronting surfaces of which are roughened as by threading to increase surface area for heat exchange, and the shield-gas cooling the tubular body as it flows toward the contact tip at the end of the tubular body which is encompassed by a gas nozzle.

18 Claims, 2 Drawing Figures

PATENTED MAR 19 1974　　　　　　　　　　　　　　　　　　　3,798,410

SHIELD-GAS WELDING GUN

The present invention relates to a shield-gas welding gun in which the filler rod (which is melted and consumed in the course of welding) is supplied to the contact tip through a tubular body which also serves as the shield-gas line, from a housing which forms the handle. Such a gun will hereinafter be referred to as a "shield-gas welding gun of the type described."

BACKGROUND OF THE INVENTION

In one known form of shield-gas welding gun of the type described, the tubular body is designed as a relatively thickwalled tube whose interior cavity serves both to convey the shield-gas to the nozzle and to accommodate the wire-guide coils which guide the filler rod to the contact tip. Between the housing or handle and the contact tip of this known form, the tubular body is unsupported.

In the neighborhood of the contact tip of a shield-gas welding gun, extremely high temperatures are developed. In known shield-gas welding guns, these high temperatures are transmitted through the tubular body to the handle, the tubular body being relatively solid in order to offer as low an electrical resistance as possible. Thus, high temperatures occur not only in the tubular body but also in the handle. Consequently, the components in the handle, in particular in the case of guns which carry relatively heavy welding current may be damaged. For this reason, it is necessary in the case of these known shield-gas welding guns to provide additional water-cooling or the like even when only relatively low welding currents are to be used. As a consequence, the constructional outlay is increased considerably.

SUMMARY OF THE INVENTION

The object of the present invention is to create a shield-gas welding gun of the kind in the two preceding paragraphs described in which no damaging heating of the handle occurs even with relatively heavy welding currents.

Fundamentally, this object is achieved in a shield-gas welding gun of the type described in accordance with the present invention by the tubular body being formed by an external and an internal tube, the interior of the internal tube serving to guide the filler rod and the annular space between external and internal tube being used to convey the shield-gas. Thanks to the double-walled design of the tubular body, it is possible to employ the shield gas flowing through the annular space between the two tubes for cooling as well, and in particular for cooling the internal tube.

If the relevant surface of the internal tube is extended in any suitable manner (as for example by providing grooves therein or fins thereon) with a view to increasing the surface area, then good heat transfer between shield-gas and internal tube will be found to take place. Similarly, if it appears expedient, the relevant surface of the external tube can also be extended in the manner just described in order to give increased surface area, so that the external tube too can yield up its heat to the surrounding air. This surface formation will sometimes be referred to hereinafter as "rough" or "roughened."

It may be advantageous to make the internal tube relatively thick-walled by comparison with the external tube, in order that the electrical resistance offered by this internal tube for the relatively heavy welding current is not too high, so that excessive loadings are not imposed by any "build-up" of welding and electrically-generated heat.

The majority of the heat developed during welding flows to the inner tube. This heat is dissipated again, however, through the increased surface area and the shield-gas.

It has been found advantageous, furthermore, in addition to extending the surface in the manner described above to produce a good degree of heat-exchange, to provide longitudinal grooves in the surface of the inner tube and thus create preferential paths for the shield-gas. If the surface of the external tube is in intimate contact with the extended or rough surface (ring profile or thread) of the internal tube, then corresponding heat-transfer between the external and internal tubes will occur if a corresponding temperature gradient exists; thus, an external tube which is for example becoming too hot will release its "surplus" heat to the internal tube whence it is dissipated by the shield-gas.

Advantageously, the tubular body formed by external and internal tubes will be accommodated in a forward extension of the housing provided in this zone with ventilation slots through which, despite the cladding of the tubular body, heat can be liberated from the external tube to the surrounding air. The forward extension of the housing is made possible by virtue of the fact that the external tube is not excessively heated.

In addition to the double-walled design, several others of the aforementioned design features are suitable for preventing undesirably heavy heat transfer to the handle section of the housing.

It may be an advantage, furthermore, to connect the gas nozzle surrounding the contact tip, via a connecting sleeve surrounding the tubular body at this zone, with the forward extended section of the housing. If this connecting sleeve is given a correspondingly thin-walled design, then again undesired heat flow towards the housing is prevented.

Finally, the shield-gas welding gun can be so designed that the axis of the handle section of the housing is more steeply inclined vis-a-vis the axis of the contact tip, than is the axis of that end of the tubular body which is located in the said handle section. This ensures that the tubular body is not so tightly curved as to impede feed of the filler rod. On the other hand, it is ensured that the contact tip and handle are so steeply inclined in relation to one another that the welder can adopt a natural working position which will not fatigue him.

Self-evidently, the shield-gas welding gun in accordance with the present invention can also be used in a "universal" manner, so that, as circumstances require, it can be operated without any shield-gas, i.e., simply using endless filler wire.

DETAILED DESCRIPTION OF THE INVENTION

Figures 1, 2:
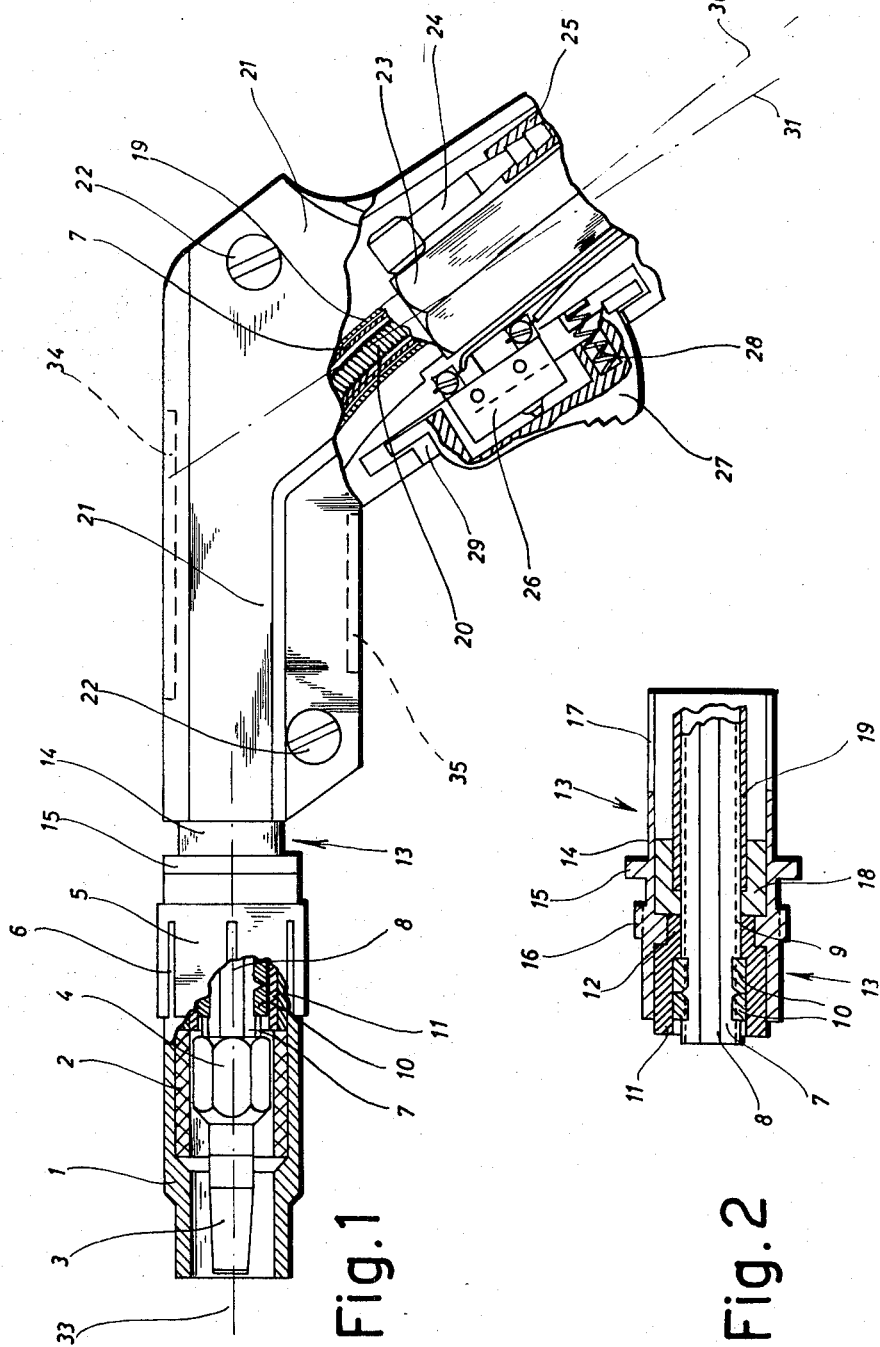
FIG. 1 is a partially sectioned side elevation of one embodiment of a shield-gas welding gun of the type described (as defined above).
FIG. 2 is a section through the essential components of the front section of the gun shown in FIG. 1.

The shield-gas welding gun illustrated in the drawing, is formed by a two-part housing 21 the halves of which are releasably connected to one another by screws 22. As a consideration of FIG. 1 clearly shows, the housing 21 is extended relatively far forwards in the direction towards the contact tip. In this forward extended section, the housing does not touch the tubular body. Furthermore, in this section ventilation slots 34 and 35 are provided in order to provide cooling through the agency of the environmental air as it flows past.

In the forward end of the housing, a connecting sleeve 13 is secured in such a way that it cannot rotate, by means of slots 17. The connecting sleeve 13 has a thin-walled section 14 between the heavily heated forward part of the gun, and the housing. A section 15 of larger diameter serves as a stop for a fixing sleeve 5 which is screwed onto a thread 16 on the connecting sleeve 13. The fixing sleeve 5 is provided with slots 6 so that the gas nozzle 1 can be plugged firmly in position.

Various components at the front end of the double-walled tubular body will now be described with reference particularly to FIG. 2, in terms of the way in which they are assembled.

The internal tube 7, which is provided with a thread 9 and longitudinal grooves 8, projects slightly at the forward end beyond the external tube 19 which is in intimate contact with the thread 9. Over the end of the external tube 19, an insulating sleeve 18 is fitted. Onto this insulated sleeve 18, the connecting sleeve 13 is then fitted in turn. On the free end of the internal tube 7, a further insulating sleeve 11, with a smaller diameter section 12, is slid into position, or, in the event that section 12 is internally threaded, is screwed into position. This insulating sleeve 11 is secured by lock nuts 10.

A small section of the thread 9 at the end of the internal tube 7 is still left free. This free end of the thread 9 is used to screw into a socket nut 4 to whose forward end the contact tip 3 is attached by screwing it on or sliding it in or over to position it.

Together with the gas nozzle 1, an insulating insert 2 is slipped on, and in the installed condition this occupies the position shown in FIG. 1.

That end of the double-walled tubular body (internal tube 7 and external tube 19) which is located in the handle of the gun, terminates in a screwed-on threaded component 23 carrying a ferrule 24 for the attachment of a hose 25 carrying the shield-gas. Furthermore, the welding current is supplied through this threaded component 23.

Underneath the threaded component 23, in the housing, a recess 29 is provided in which the switch 26 for the control current is housed.

The switch 26 is operated by a trigger element 27 supported by an additional spring 28 and displaceable in the recess 29 in order to switch on a continuous welding current.

The axis 31 of the handle of the housing 21 is more steeply inclined to the axis 33 of the contact tip, than is the axis 30 of that end of the tubular body which is attached to the threaded component 23. In this way, curvature of the tubular body is kept as gentle as possible so that a filler rod advancing through a wire-guide coil 20, does not experience unnecessary friction. On the other hand, the axis 31 of the handle is more steeply inclined to the axis 33 of the contact tip than is usual so that the welder can adopt the most natural position possible when welding and will thereby avoid unnecessary fatigue.

In the shield-gas welding gun, the feed of the filler rod takes place through the bore of the wire-guide coil 20 arranged inside the internal tube 7. The shield-gas supplied through the hose 25 flows into an annular space between the internal and external tubes and through the longitudinal grooves 8 in the surface of the internal tube. In view of the enlargement of the surface produced by the thread 9, and the roughening of the surface of the internal tube, good heattransfer between the shield-gas and internal tube is ensured. The shield-gas which is required for the welding operation in any case, is therefore used simultaneously as a coolant. Owing to the fact that the longitudinal grooves 8 are exposed at the front end of the gun (they are not closed off by the lock nuts 10), the shield-gas flows out at this point and into the annular space between contact tip and gas nozzle. The filler rod exits through the central bore in the contact tip.

What is claimed is:

1. A shield-gas welding gun comprising a housing forming a handle and a tubular body extending through the housing for carrying the welding filler rod into which welding current is supplied, the tubular body being formed by concentric external and internal tubes, the interior of the internal tube bearing a wire-guide serving to guide the filler rod and to space the same from the internal tube, the annular space between said external and internal tubes being used to convey the shield-gas.

2. A welding gun as claimed in claim 1 wherein said concentric tubes have concentric surfaces confronting each other, one of said surfaces having undulations therein to improve its heat-exchange properties by increasing the surface area thereof.

3. A welding gun as claimed in claim 2 wherein the internal tube is provided with a rough, confronting exterior surface to improve its heat-exchange properties by increasing the surface area thereof.

4. A welding gun is claimed in claim 2 wherein the undulations in said one surface are formed around the circumference of the tube.

5. A welding gun as claimed in claim 2 wherein said undulations define passage ways in said one surface of the internal tube for the passage of the shield-gas.

6. A welding gun as claimed in claim 5 wherein one of said passageways takes the form of a longitudinal groove.

7. A welding gun as claimed in claim 1 wherein the external tube is thin-walled by comparison with the internal tube.

8. A welding gun as claimed in claim 4 wherein the undulations define threads on the circumference of the internal tube which bear against the internal surface of the external tube.

9. A welding gun as claimed in claim 1 wherein the housing forming the handle is extended forwardly adjacent the end of the tubular body and surrounds the tubular body without touching it.

10. A welding gun as claimed in claim 9 wherein the forwardly extended portion of the housing is provided with ventilation slots adjacent the tubular body.

11. A welding gun as claimed in claim 9 and a gas nozzle on the end of the tubular body and connected through a connecting sleeve which surrounds the tubular body to the forwardly extended portion of the housing.

12. A welding gun as claimed in claim 11, wherein that the connecting sleeve is thin-walled over that section thereof at which the connection of said sleeve to said forwardly extended section of the housing is made.

13. A welding gun as claimed in claim 12, wherein said thin-walled section of the connecting sleeve is provided with slots.

14. A welding gun as claimed in claim 12 wherein the gas nozzle surrounds a contact tip of the tubular body and is slipped over a section of the connecting sleeve which is remote from said thin-walled section thereof.

15. A welding gun as claimed in claim 14 wherein the gas nozzle is secured by a fixing sleeve attached to said connecting sleeve.

16. A welding gun as claimed in claim 1 including a contact tip joined to the tubular body and wherein the access of the handle section of the housing is more steeply inclined to the access of the contact tip than is the access of that tubular body portion which is located in said handle section.

17. A shield-gas welding gun comprising a housing forming a handle, a tubular body extending through the housing for carrying the welding filler rod into which welding current is supplied, the tubular body being formed by concentric external and internal tubes, the latter having arranged therein a wire-guide coil to guide the filler rod and to space the same from the internal tube, said internal and external tubes having an annular space there between to convey shield-gas and wherein the external surface of the internal tubular body has undulations therein to improve its heat-exchange properties by increasing the surface area thereof.

18. The welding gun as claimed in claim 17 wherein said undulations comprise longitudinal grooves circumferentially of said internal tube body.

* * * * *